United States Patent [19]
Southgate et al.

[11] Patent Number: 6,110,223
[45] Date of Patent: Aug. 29, 2000

[54] GRAPHIC EDITOR FOR BLOCK DIAGRAM LEVEL DESIGN OF CIRCUITS

[75] Inventors: Timothy J. Southgate, Redwood City; Michael Wenzler, Piedmont, both of Calif.

[73] Assignee: Altera Corporation, San Jose, Calif.

[21] Appl. No.: 08/958,434

[22] Filed: Oct. 27, 1997

Related U.S. Application Data

[60] Provisional application No. 60/029,277, Oct. 28, 1996.

[51] Int. Cl.$^7$ .................................................. G06F 17/50
[52] U.S. Cl. ................................. 716/18; 716/3; 716/7; 716/17; 703/14
[58] Field of Search .......................... 395/500.02–500.22, 395/500.35–500.37; 716/1–21; 703/13–22

[56] References Cited

U.S. PATENT DOCUMENTS

| | | | |
|---|---|---|---|
| 4,768,087 | 8/1988 | Taub et al. | 348/3 |
| 4,916,738 | 4/1990 | Chandra et al. | 713/159 |

(List continued on next page.)

FOREIGN PATENT DOCUMENTS

| | | | |
|---|---|---|---|
| 0703531A1 | 3/1996 | European Pat. Off. | G06F 9/44 |
| 92/09160 A1 | 5/1992 | WIPO | H04L 9/00 |
| 96/32679 | 10/1996 | WIPO | G06F 13/00 |
| 97/48044 | 12/1997 | WIPO | G06F 9/445 |

OTHER PUBLICATIONS

Spang, III et al. ("The BEACON block–diagram environment", World Congress of the International Federation of Automatic Control, vol. 2, Robust Control, Design and Software, pp. 749–754, Jan. 01, 1994).

Rimvall et al. ("An open architecture for automatic code generation using the BEACON CACE environment", Proceedings of IEEE/IFAC Joint Symposium on Computer–Aided Control System Design, Mar. 7, 1994, pp. 315–320).

Girardi et al. ("A register transfer level schematic editor and simulator interface", CSELT Technical Reports, vol. 13, No. 6, pp. 403–409, Nov. 1, 1985).

Bershad, et al., "Lightweight Remote Procedure Call," *ACM Transactions on Computer Systems*, 8:1, pp. 37–55 (1990), Feb. 1990.

Ganguly, et al., "HSIM1 and HSIM2: Object Oriented Algorithms for VHDL Simulation," *Proceedings of the Seventh Intl. Conf. on VLSI Design*, pp. 175–178 (1994), Jan. 5, 1994.

(List continued on next page.)

*Primary Examiner*—Paul R. Lintz
*Assistant Examiner*—Phallaka Kik
*Attorney, Agent, or Firm*—Beyer Weaver & Thomas, LLP

[57] ABSTRACT

A method is described herein for designing a circuit using graphic editor software. A graphic design file is generated corresponding to a block diagram created in a graphical user interface associated with the graphic editor software. The block diagram includes a plurality of blocks and a plurality of conduits interconnecting the blocks. A block design file is generated in one of a plurality of formats for each of selected ones of the plurality of blocks in the block diagram. Each of the block design files corresponds to an implementation of its corresponding block. Modifications to any of the graphic design file and the block design files are incorporated into each other under software control.

38 Claims, 8 Drawing Sheets

U.S. PATENT DOCUMENTS

| | | | |
|---|---|---|---|
| 5,008,814 | 4/1991 | Mathur | 709/221 |
| 5,050,091 | 9/1991 | Rubin | 716/10 |
| 5,111,413 | 5/1992 | Lazansky et al. | 703/14 |
| 5,155,836 | 10/1992 | Jordan et al. | 703/23 |
| 5,155,837 | 10/1992 | Liu et al. | 709/221 |
| 5,206,939 | 4/1993 | Yanai et al. | 711/4 |
| 5,220,512 | 6/1993 | Watkins et al. | 716/11 |
| 5,278,769 | 1/1994 | Bair et al. | 703/19 |
| 5,301,318 | 4/1994 | Mittal | 717/1 |
| 5,335,320 | 8/1994 | Iwata et al. | 717/4 |
| 5,367,468 | 11/1994 | Fukusawa et al. | 716/11 |
| 5,418,728 | 5/1995 | Yada | 700/97 |
| 5,422,833 | 6/1995 | Kelem et al. | 703/14 |
| 5,423,023 | 6/1995 | Batch et al. | 717/1 |
| 5,436,849 | 7/1995 | Drumm | 716/18 |
| 5,442,790 | 8/1995 | Nosenchuck | 717/7 |
| 5,463,563 | 10/1995 | Bair et al. | 716/11 |
| 5,499,192 | 3/1996 | Knapp et al. | 716/17 |
| 5,513,124 | 4/1996 | Trimberger et al. | 716/7 |
| 5,524,253 | 6/1996 | Pham et al. | 709/202 |
| 5,526,517 | 6/1996 | Jones et al. | 707/8 |
| 5,541,849 | 7/1996 | Rostoker et al. | 716/18 |
| 5,572,436 | 11/1996 | Dangelo et al. | 716/18 |
| 5,572,437 | 11/1996 | Rostoker et al. | 716/18 |
| 5,574,655 | 11/1996 | Knapp et al. | 716/17 |
| 5,594,657 | 1/1997 | Cantone et al. | 716/16 |
| 5,623,418 | 4/1997 | Rostoker et al. | 716/1 |
| 5,625,565 | 4/1997 | Van Dyke | 716/1 |
| 5,661,660 | 8/1997 | Freidin | 716/1 |
| 5,673,198 | 9/1997 | Lawman et al. | 716/11 |
| 5,691,912 | 11/1997 | Duncan | 716/11 |
| 5,696,454 | 12/1997 | Trimberger | 326/38 |
| 5,715,387 | 2/1998 | Barnstijn et al. | 714/38 |
| 5,721,912 | 2/1998 | Stepczyk et al. | 707/102 |
| 5,737,234 | 4/1998 | Seidel et al. | 716/1 |
| 5,745,748 | 4/1998 | Ahmad et al. | 707/10 |
| 5,761,079 | 6/1998 | Drumm | 716/11 |
| 5,790,416 | 8/1998 | Norton et al. | 716/11 |
| 5,801,958 | 9/1998 | Dangelo et al. | 716/18 |
| 5,805,861 | 9/1998 | Gilbert et al. | 703/15 |
| 5,809,145 | 9/1998 | Slik et al. | 705/52 |
| 5,812,847 | 9/1998 | Joshi et al. | 709/329 |
| 5,819,072 | 10/1998 | Bushard et al. | 716/10 |
| 5,848,263 | 12/1998 | Oshikiri | 716/3 |
| 5,850,348 | 12/1998 | Berman | 716/6 |
| 5,867,691 | 2/1999 | Shiraishi | 713/400 |
| 5,870,308 | 2/1999 | Dangelo et al. | 716/18 |
| 5,878,225 | 3/1999 | Bilansky et al. | 709/227 |
| 5,896,521 | 4/1999 | Shackleford et al. | 703/21 |
| 5,901,066 | 5/1999 | Hong | 716/8 |
| 5,903,475 | 5/1999 | Gupte et al. | 703/16 |
| 5,909,545 | 6/1999 | Frese, II et al. | 709/208 |
| 5,983,277 | 11/1999 | Heile et al. | 709/232 |

OTHER PUBLICATIONS

Gavish, et al., "Dynamic File Migration in Distributed Computer Systems," *Communications of the ACM*, 33:2, pp. 177–189 (1990), Feb. 1990.

Iftode, et al., "Shared Vitual Memory with Automatic Update Support," *ICS ACM*, pp. 175–183 (1999), Jan. 1999.

Keleher, "Tapeworm: High–Level Abstractions of Shared Accesses," *USENIX Association OSDI*, pp. 201–214 (1999), Jan. 1999.

Maurer, "Efficient Simulation for Hierarchical and Partitioned Circuits," *Proceedings of the Twelfth Intl. Conf. on VLSI Design*, pp. 236–241 (1999), Jan. 7, 1999.

Riley et al., "An Instance of the Application Download Pattern: The SPAIDS Software Loader/ Verifier Domain Analysis and Implementations," ACM 1997, pp. 273–278, Jan. 1997.

Girardi et al., "A Register Transfer Level Schematic Editor and Simulator Interface," CSELT Technical Reports, vol. 13, No. 6, Nov. 1985, pp. 403–409.

Heinkel et al., "An Approach for a Dynamic Generation/ Validation System for the Functional Simulation Considering Timing Constraints", Proceedings of European Design & Test Conference, Mar. 11, 1996, pp. 302–306.

Summit Design Inc., "Visual HDL for Verilog Short Course," Sep. 19, 1996, pp. 1–167, *IEEE*.

GRAPHIC EDITOR FOR BLOCK DIAGRAM LEVEL DESIGN OF CIRCUITS

RELATED APPLICATION DATA

The present application claims priority from U.S. Provisional Application Ser. No. 60/029,277 entitled TOOLS FOR DESIGNING PROGRAMMABLE LOGIC DEVICES filed on Oct. 28, 1996, the entire specification of which is incorporated herein by reference.

This invention is related to U.S. patent application Ser. No. 08/958,002, filed on the same day as this patent application, naming B. Pedersen et al. as inventors, and entitled "GENERATION OF SUB-NET LISTS FOR USE IN INCREMENTAL COMPILATION." That application is incorporated herein by reference in its entirety and for all purposes.

This invention is also related to U.S. patent application Ser. No. 08/958,436, filed on the same day as this patent application, naming J. Tse et al. as inventors, and entitled "FITTING FOR INCREMENTAL COMPILATION OF ELECTRONIC DESIGNS." That application is incorporated herein by reference in its entirety and for all purposes.

This invention is also related to U.S. patent application Ser. No. 08/958,670, filed on the same day as this patent application, naming D. Mendel as inventor, and entitled "PARALLEL PROCESSING FOR COMPUTER ASSISTED DESIGN OF ELECTRONIC DEVICES." That application is incorporated herein by reference in its entirety and for all purposes.

This invention is also related U.S. patent application Ser. No. 08/958,626, filed on the same day as this patent application, naming F. Heile et al. as inventors, and entitled "INTERFACE FOR COMPILING DESIGN VARIATIONS IN ELECTRONIC DESIGN ENVIRONMENTS." That application is incorporated herein by reference in its entirety and for all purposes.

This invention is also related to U.S. patent application Serial No. 08/958,778, filed on the same day as this patent application, naming T. Southgate as inventor, and entitled "METHOD AND APPARATUS FOR AUTOMATED CIRCUIT DESIGN." That application is incorporated herein by reference in its entirety and for all purposes.

This invention is also related to U.S. patent application Ser. No. 08/958,434, filed on the same day as this patent application, naming T. Southgate et al. as inventors, and entitled "GRAPHIC EDITOR FOR BLOCK DIAGRAM LEVEL DESIGN OF CIRCUITS." That application is incorporated herein by reference in its entirety and for all purposes.

This invention is also related to U.S. patent application Ser. No. 08/958,432, filed on the same day as this patent application, naming T. Southgate et al. as inventors, and entitled "DESIGN FILE TEMPLATES FOR IMPLEMENTATION OF LOGIC DESIGNS." That application is incorporated herein by reference in its entirety and for all purposes.

This invention is also related to U.S. patent application Ser. No. 08/958,414, filed on the same day as this patent application, naming T. Southgate as inventor, and entitled "METHOD FOR PROVIDING REMOTE SOFTWARE TECHNICAL SUPPORT." That application is incorporated herein by reference in its entirety and for all purposes.

This invention is also related to U.S. patent application Ser. No. 08/958,777, filed on the same day as this patent application, naming T. Southgate as inventor, and entitled "METHOD FOR SIMULATING A CIRCUIT DESIGN" That application is incorporated herein by reference in its entirety and for all purposes.

This invention is also related to U.S. patent application Ser. No. 08/957,957, filed on the same day as this patent application, naming F. Heile et al. as inventors, and entitled "WORKGROUP COMPUTING FOR ELECTRONIC DESIGN AUTOMATION." That application is incorporated herein by reference in its entirety and for all purposes.

This invention is also related to U.S. patent application Ser. No. 08/958,798, now U.S. Pat. No. 6,026,226, filed on the same day as this patent application, naming F. Heile as inventor, and entitled "LOCAL COMPILATION IN CONTEXT WITHIN A DESIGN HIERARCHY." That application is incorporated herein by reference in its entirety and for all purposes.

This invention is also related to U.S. patent application Ser. No. 08/958,435, filed on the same day as this patent application, naming Alan L. Herrmann et al. as inventors, and entitled "EMBEDDED LOGIC ANALYZER FOR A PROGRAMMABLE LOGIC DEVICE." That application is incorporated herein by reference in its entirety and for all purposes.

This invention is also related to U.S. patent application Ser. No. 08/958,431, filed on the same day as this patent application, naming F. Heile as inventor, and entitled "ELECTRONIC DESIGN AUTOMATION TOOL FOR DISPLAY OF DESIGN PROFILE." That application is incorporated herein by reference in its entirety.

BACKGROUND OF THE INVENTION

The present invention relates generally to techniques for designing integrated circuits (ICs). Specifically, the present invention relates to the use of a software graphic editor for designing logic devices using one or more high level block diagrams.

Despite the prevalence of sophisticated design software and automated manufacturing techniques, the first step in designing often involves a hand drawn block diagram in designer's notebook. The hand drawn block diagram is typically used as a tool for organizing the thoughts of the designer as to the high-level architecture and functionalities of the device but is not typically used as a software design entry point. In fact, several levels of such hand drawn block diagrams of increasing detail are often employed until the level of detail reaches a point where currently available software design tools can provide design elements having the requisite functionalities.

There are computer aided drawing (CAD) tools with which a designer can create such block diagrams in a graphical user interface. However, such CAD tools do not interface with the design tools used for defining the circuit level implementation of the blocks in the block diagram. Even with an electronically created block diagram, unrelated design files must be created for the implementation of the individual blocks of the diagram. That is, a block diagram created with a currently available CAD tool is about as useful as a hand drawn block diagram with regard to the circuit level implementation of a design.

It is therefore apparent that there is a need for a design tool which will enable the designer not only to create high level block diagrams, but to actually use these diagrams in the software environment as a design entry point, and moreover to use the diagrams in conjunction with existing design tools to implement gate level design.

SUMMARY OF THE INVENTION

According to the present invention a graphic editor is provided which enables IC designers to create and use block diagrams of varying levels of detail as design entry points, and to use these block diagrams in conjunction with a wide variety of existing design file editors, e.g., AHDL, VHDL, and Verilog editors, to implement down to gate level design. Rather than drawing a block diagram in a notebook, the designer uses the graphic editor of the present invention to create the block diagram on his workstation screen using visual representations selected in the editor's graphical user interface (GUI). The designer specifies input and outputs for each block in the diagram and interconnects the blocks with generalized conduits each representing one or more of the actual connections between the blocks. The designer then specifies the signal names in the conduits and maps the signal names to the inputs and outputs of the various blocks.

If necessary, the designer may use the editor in much the same way to create increasingly detailed block diagrams corresponding to each of the blocks in a higher level diagram. A separate graphic design file is created for each block diagram on each level of the architecture hierarchy. Once the designer has specified the design to a sufficient level of detail, he can create a circuit level implementation of the blocks in any of a variety of design file formats using a variety of design file editors including, for example, AHDL, VHDL, and Verilog editors. According to a specific embodiment of the invention, the block diagrams created using the graphic editor of the present invention are employed in combination with design file templates to create design files in the design file format favored by the individual designer. That is, using the block specifications in the block diagram and a design file template of a particular format, an incomplete design file is created in the desired format within which the designer may then specify the function of the corresponding block.

Thus, according to the present invention, a method is described for designing a circuit using graphic editor software. A graphic design file is generated corresponding to a block diagram created in a graphical user interface associated with the graphic editor software. The block diagram includes a plurality of blocks and a plurality of conduits interconnecting the blocks. A block design file is generated in one of a plurality of formats for each of selected ones of the plurality of blocks in the block diagram.

Each of the block design files corresponds to an implementation of its corresponding block. Modifications to any of the graphic design file and the block design files are incorporated into each other under software control.

A further understanding of the nature and advantages of the present invention may be realized by reference to the remaining portions of the specification and the drawings.

DESCRIPTION OF SPECIFIC EMBODIMENTS

A specific embodiment of the present invention will now be described according to a particular design methodology. It will be understood, however, that a wide variety of design methodologies may employ the techniques described herein.

Figure 1:
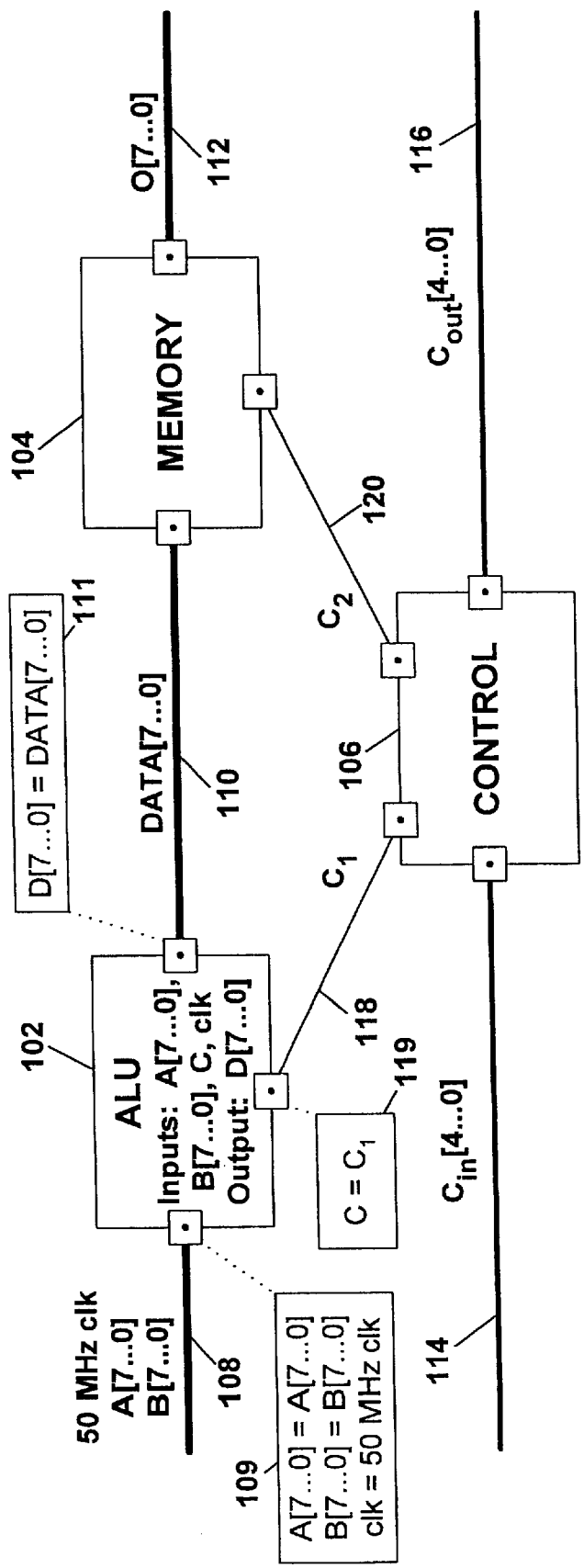
FIG. 1 is a high level block diagram of an integrated circuit design created using the graphic editor of the present invention.

FIG. 1 is a high level block diagram of an integrated circuit design created using the graphic editor of the present invention. Using standard elements in the graphic editor or his own customized elements, the designer lays out on the screen of his workstation a high level design of his integrated circuit according to the system specifications which may include, for example, the device external specification (e.g., pinout) and the timing requirements. That is, both blocks and symbols may be included in the same diagram. Such a design may include, for example, an arithmetic logic unit (ALU) 102, a memory 104, and some kind of control circuitry 106. The designer then interconnects blocks 102, 104 and 106 and specifies external connections to the device via a plurality of conduits, each of which represents one or more signals in either direction as required to implement the functionalities desired by the designer. For example, conduit 108 represents input signals A[7 . . . 0] and B[7 . . . 0] and a 50 MHz clock signal. Conduit 110, with the specification DATA[7 . . . 0], represents the data lines between ALU 102 and memory 104. Conduit 112, with the specification O[7 . . . 0], represents the output signal or signals of the device. Conduits 114 and 116 respectively represent the control inputs and outputs to the device as specified by $C_{in}[4 \ldots 0]$ and $C_{out}[4 \ldots 0]$. Finally, conduits 118 and 120 respectively represent control signals $C_1$ and $C_2$ for ALU 102 and memory 104.

The graphic editor of the present invention is extremely flexible in the way in which block diagrams may be manipulated. Blocks may be resized as desired. Conduits may be connected to any side of a block. Because the conduits can represent multiple signals with a single conduit name, I/O may easily be added to a diagram without affecting the current configuration of blocks and conduits.

The designer then specifies the I/O for each of the blocks. For example, because it is an ALU, block 102 will receive two inputs and, given some control input, provide an output. Thus, the designer might specify inputs A[7 . . . 0] and B[7 . . . 0], control input C, and data output D[7 . . . 0]. A clock input clk would also typically be specified. I/O for memory block 104 and control circuitry 106 (not shown) are similarly specified. The I/O for each block is then mapped to the signal names in the associated conduits. This enables the designer to specify a particular block very generally so that it may be used elsewhere in the design or in other designs. Thus inputs A[7 . . . 0] and B[7 . . . 0] are mapped to identically named signals A[7 . . . 0] and B[7 . . . 0] in conduit 108 while the input clk is mapped to 50 MHz clock in the same conduit (see box 109). Output D[7 . . . 0] is mapped to DATA[7 . . . 0] in conduit 110 (box 111) while input C is mapped to $C_1$ in conduit 118 (box 119). The I/O for blocks 104 and 106 are similarly mapped to the associated conduits (not shown). The fully specified block diagram, i.e., the drawing information, is stored in a graphic design file.

Figure 2:
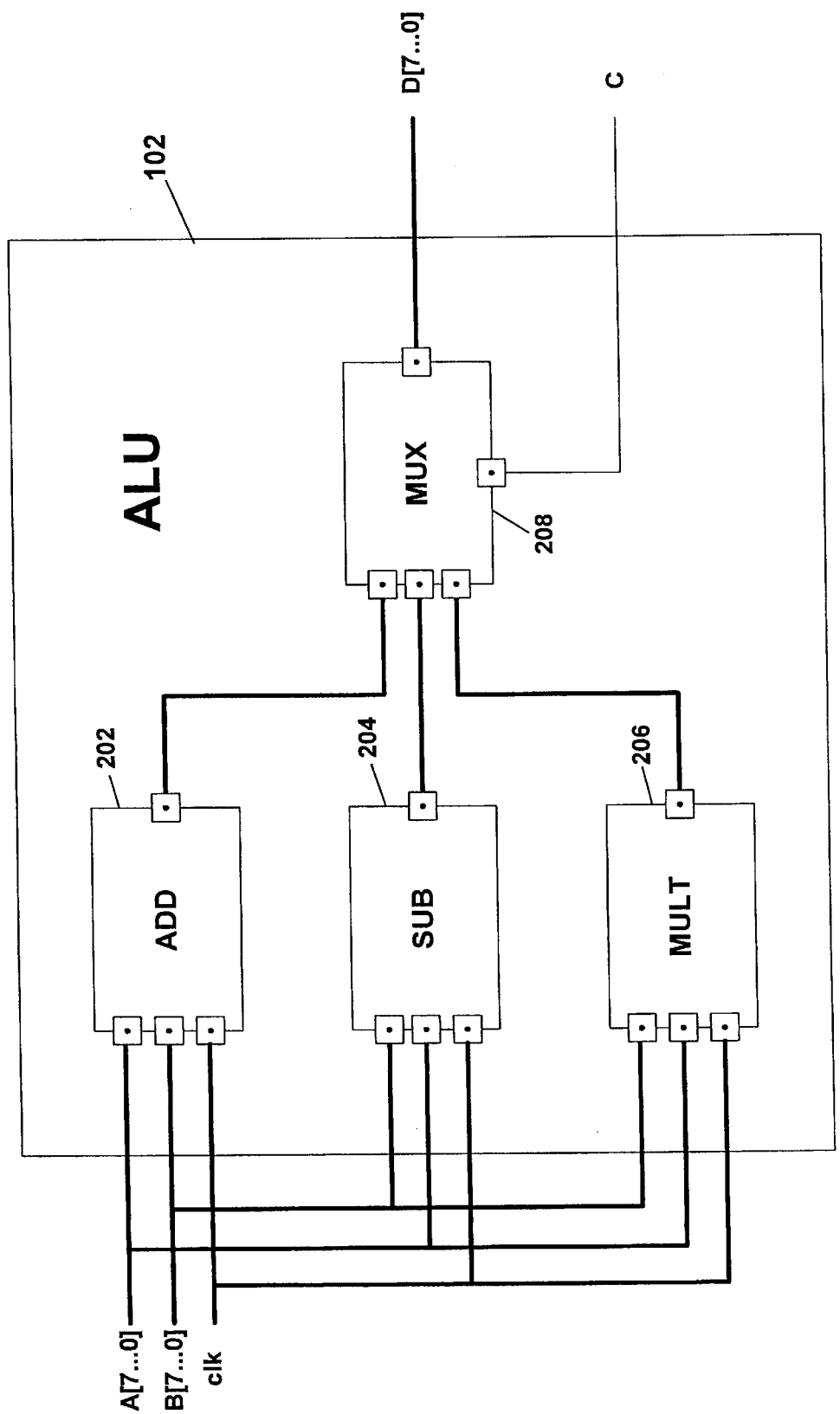
FIG. 2 is a block diagram of the arithmetic logic unit of FIG. 1 created using the graphic editor of the present invention.

Once the designer has a fully specified high level block diagram he may create more detailed block diagrams or circuit level implementations of each of the blocks in the high level diagram as required by executing a "hierarchy down" command which instantiates the I/O of a selected block in a new lower level block diagram or, as discussed below in a design file format of the designer's choosing. FIG. 2 is a block diagram of ALU 102 created using the same graphic editor. Block I/O and mappings are not shown. Adder 202, subtractor 204 and multiplier 208 receive inputs A[7 . . . 0] and B[7 . . . 0] and provide outputs to multiplexer 210 which is controlled by input C and provides output D[7. . . 0]. Each of the block I/O and conduit signal names within ALU 102 may be fully specified by the designer and mapped to each other using substantially the same procedure as described above with reference to FIG. 1. The I/O and signal names may, as in this example, or may not correspond to those of the higher level diagram depending upon what nomenclature scheme makes the most sense for the particular design. A separate graphic design file is created for each block diagram on each level of the device architecture hierarchy.

Depending upon the design, the designer may continue to create block diagrams of increasing detail until he reaches a point at which circuit level implementations of the diagram blocks may be created using a variety of available design tools such as, for example, the graphic editor of the invention, a VHDL or Verilog text editor or one of several commercially available proprietary schematic editors. The block diagram created using the graphic editor may be employed in combination with one or more design file templates to create a design file for each block in the design file format associated with the design tool favored by the designer. That is, using the block diagram and a design file template of a particular format, an incomplete design file is created which instantiates the I/O specification of a selected block in a file of the selected design file format. For the text formats supported by the present invention, the design file templates include much of the complicated syntax which the designer would otherwise need to write. The designer may then complete the design file by specifying the implementation of the block. The implementation may be, for example, another block diagram or the circuit level implementation of the block. This may be done for each of the blocks in the higher level diagram. The use of the design file templates proves to be much less labor intensive than the designer using a text editor and creating design files for each block from scratch.

Thus, not only does the present invention allow the designer to electronically (i.e., under software control) use block diagrams in designing down to the circuit level implementation of his design, it also allows him to avoid much of the work involved in setting up the design files which describe the various levels of his design. This is especially valuable for the more complex, syntax-heavy design file formats such as VHDL and Verilog. In addition, the designer may customize the design file template to incorporate personal preferences such as formatting and documentation. A more complete discussion of the use of design file templates is provided in commonly assigned, copending U.S. patent application Ser. No. 958,414 entitled DESIGN FILE TEMPLATES FOR IMPLEMENTATION OF LOGIC DESIGNS filed simultaneously herewith, the entire specification of which is incorporated herein by reference.

Another advantage of using the block diagram specifications to generate lower level design files is realized when a modification must be made to a design file which corresponds to a particular block diagram. If, for example, a signal line must be added between two blocks, the designer merely has to add the desired signal line to the block diagram using the graphic editor and request that the design files corresponding to the affected blocks be updated. The new signal line is then automatically incorporated into the appropriate design files. Any designer who has had to manually incorporate the syntax corresponding to such additions into a text format design file will fully appreciate this advantage.

Figure 3:
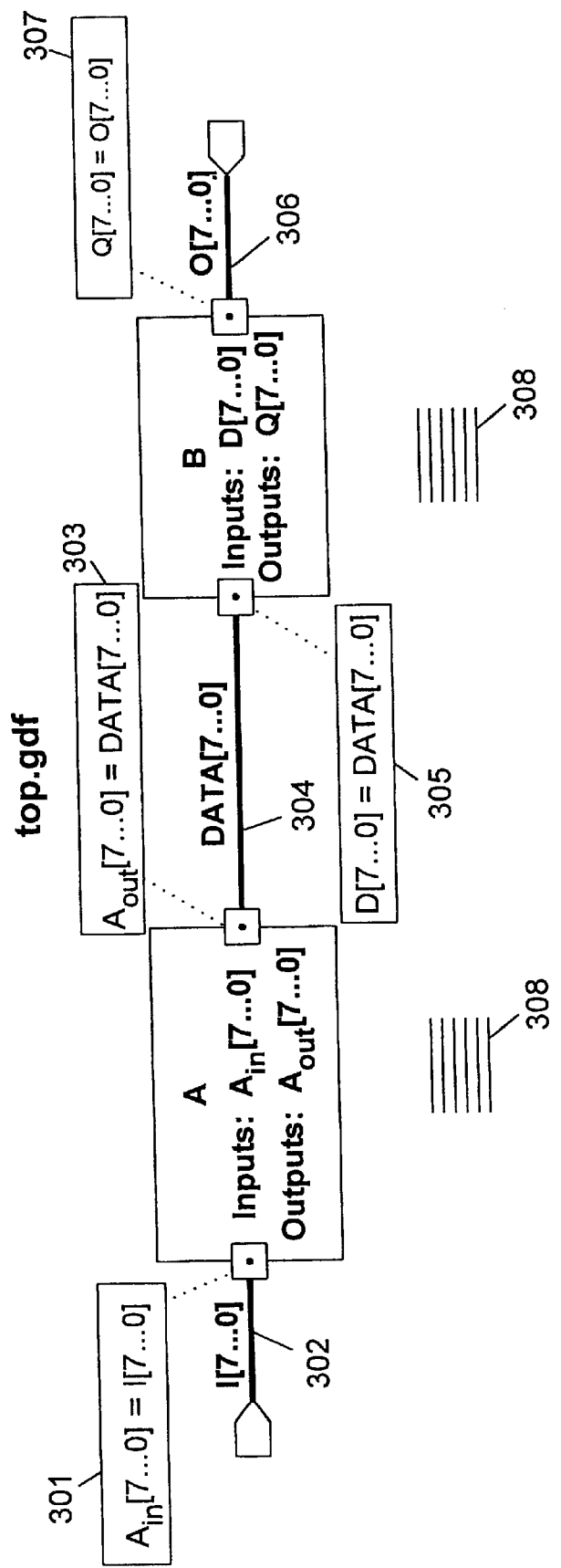
FIG. 3 is another high level block diagram of an integrated circuit design created using the graphic editor of the present invention.
Figure 4:
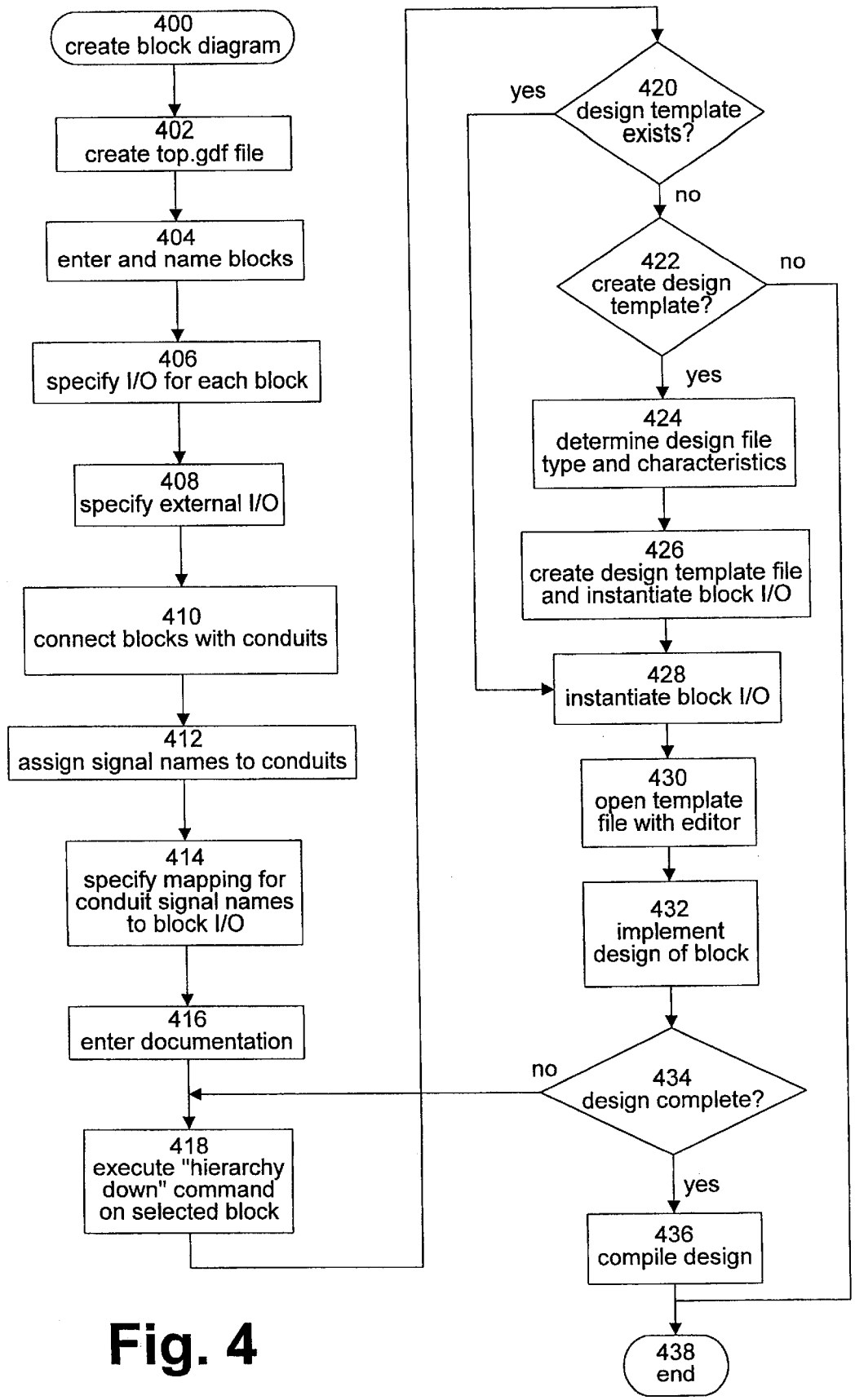
FIG. 4 is a flowchart illustrating the creation of the block diagram of FIG. 3.

FIG. 3 is another high level block diagram of an integrated circuit design created using the graphic editor of the present invention. FIG. 4 is a flowchart illustrating the creation of the block diagram of FIG. 3. The operation of a specific embodiment of the invention will now be described with reference to FIGS. 3 and 4. Specifically, the creation of a top level block diagram and the design flow toward more detailed specification of the blocks will be described. However, it will be understood that a wide variety of design paradigms and procedures are supported by the present invention. That is, as will be described in greater detail below, procedures which work in the opposite direction, i.e., from levels of greater detail to levels of lower detail, are also within the scope of the present invention.

Typically, a designer begins the design process by telling the graphic editor of the present invention to "create design file", in response to which command the graphic editor creates an empty design file of the type specified by the designer (step 402). Broadly speaking, there are two design file types, block diagram/schematic design files, i.e., graphic design files (.gdf), which may be edited using the graphic editor, and text design files, e.g., VHDL files, which are edited using the appropriate text editor. In this example, the first created design file is a very high level block diagram and will be referred to as top.gdf. It will be understood that the initial design file format may vary depending upon the particular designer's methodology. A hierarchy information file (design.hif) corresponding to the overall design is also created which provides information as to all of the design files which are associated with a particular design. The term design file as used herein encompasses both graphic design files created using the graphic editor of the present invention or any of a variety of schematic editors, as well as text design files created using any of a variety of text design editors (e.g., VHDL and Verilog editors).

The designer then enters and names any desired number of blocks (step 404) using a variety of methods including dragging blocks from a template using a mouse and selecting a block from a menu or tool bar. As shown in FIG. 3, blocks A and B are entered. Existing block templates provided in the graphic editor may be used or new block templates with a wide variety of customized features may be created by the designer. I/O for each of the blocks are then specified (step 406) unless an existing template is used for which the necessary I/O is already specified. In this example, inputs $A_{in}$[7 . . . 0] and outputs $A_{out}$[7 . . . 0] are specified for block A, and inputs D[7 . . . 0] and outputs Q[7 . . . 0] are specified for block B. The external I/O are then specified (step 408). External I/O for top.gdf are the connections to the outside world, e.g., the pin out of the chip. For intermediate block diagrams, the external I/O are the connections to the next level diagram in the hierarchy. The external I/O in the present example are specified as I[7 . . . 0] and O[7 . . . 0]. The blocks and external I/O of the diagram are then interconnected using conduits, each of which represent most or all of the connections between its associated blocks (step 410).

As with the blocks, conduits may be entered in the diagram in a variety of ways. Conduit may also be named although this is not essential. Signal names are then assigned to each conduit for each of the connections associated with that conduit (step 412). Thus, for the block diagram of FIG. 3, signals I[7 . . . 0] are assigned to conduit 302, signals DATA[7 . . . 0] are assigned to conduit 304, and signals O[7 . . . 0] are assigned to conduit 306. It will be understood that the entering of blocks and conduits and the naming and specifying of blocks and conduits need not necessarily be done according to some prescribed sequence but may be accomplished in a manner suited to the individual designer's design methodology.

Once the blocks, conduits and external I/O are specified, the conduit signal names are mapped to the associated block and external I/O (step 414). So, for example, signals DATA[7 . . . 0] in conduit 304 are mapped to outputs $A_{out}$ [7 . . . 0] of block A and inputs D[7 . . . 0] of block B as shown in boxes 303 and 305. Similarly inputs $A_{in}$[7 . . . 0] are mapped to signals I[7 . . . 0] (box 301) and outputs Q[7 . . . 0] are mapped to signals O[7 . . . 0] (box 307). This feature allows the designer to create generic blocks which may be used in more than one diagram, or of which multiple instances may appear in the same diagram. When the mapping is completed, top.gdf is a complete graphic design file. Documentation of any type (e.g., text 308) is then entered into the diagram if desired for the purpose of, for example, a design review (step 416). Text 308 might include, for example, the mapping of block I/O to conduit signal names.

Upon execution of a "hierarchy down" command for a selected block in the completed top.gdf file (step 418), the selected block may be further specified by creation of another design file describing a lower level block diagram, or the circuit level implementation of the block. This is, of course, only done for blocks which have not already been fully implemented, i.e., one or more of the blocks in a diagram may already be fully implemented down to the gate level and have been imported from a library, some other design, or elsewhere in the same design. Essentially, a new design file is created from a design file template in the appropriate format, and the I/O of the block is instantiated in the design file for further specification by the designer using the graphic editor of the present invention (for a graphic format) or any of a variety of available design tools (for a text format).

If a design file for the specified block does not already exist (step 420), the graphic editor asks the user (e.g., via a dialog box) whether a new design file should be created (step 422) and what the type and characteristics of the file should be (step 424). The file is then created (step 426) and the block I/O is instantiated therein (step 428). If the design file already exists, it is associated with the specified block.

An "implement block" command is then executed in response to which the newly created design file is opened with the appropriate design file editor (step 430). That is, if the user specified a design file type which uses the graphic editor of the present invention, i.e., a graphic design file, a representation of the newly created design file would be presented in a GUI similar to that of the higher level block diagram with the appropriate external I/O specified. If, however, the user specified a text design file type, e.g., VHDL or Verilog, the appropriate text editor is used to open the newly created design file. The design of the block is then implemented using the appropriate design file editor (step 432).

If the design is complete, i.e., all of the blocks have been implemented down to the circuit level description (step 434), all of the design files associated with the design are compiled (step 436) and the process is terminated. If the design is not complete, steps 418–432 are repeated until the full circuit level implementation is completed.

The above-described design process assumes that the designer begins with a high level block diagram and progressively works toward levels of greater detail until the design is fully specified. However, according to various embodiments of the invention, the designer may begin at any level of detail and work in either direction. That is, the designer may, for example, begin by creating or importing a previously created circuit level design file in VHDL, and then use the graphic editor of the present invention to instantiate the design file in a higher level block diagram. Or, the designer may start with an intermediate level block diagram, work down to the circuit level implementation as described with reference to FIGS. 3 and 4, and then instantiate the fully specified intermediate block diagram as a block in a higher level block diagram above the intermediate level block diagram. This flexibility may be inferred from step 420 of FIG. 4 which determines whether a design file already exists for a particular block when a "hierarchy down" command is executed. That is, the graphic editor is determining whether the selected block corresponds to a lower level design file which has already been specified. It will be understood that this necessarily implies that the design of the lower levels, i.e., the levels of greater detail, may precede the design of the higher levels, i.e., the levels of lesser detail.

Figure 5:
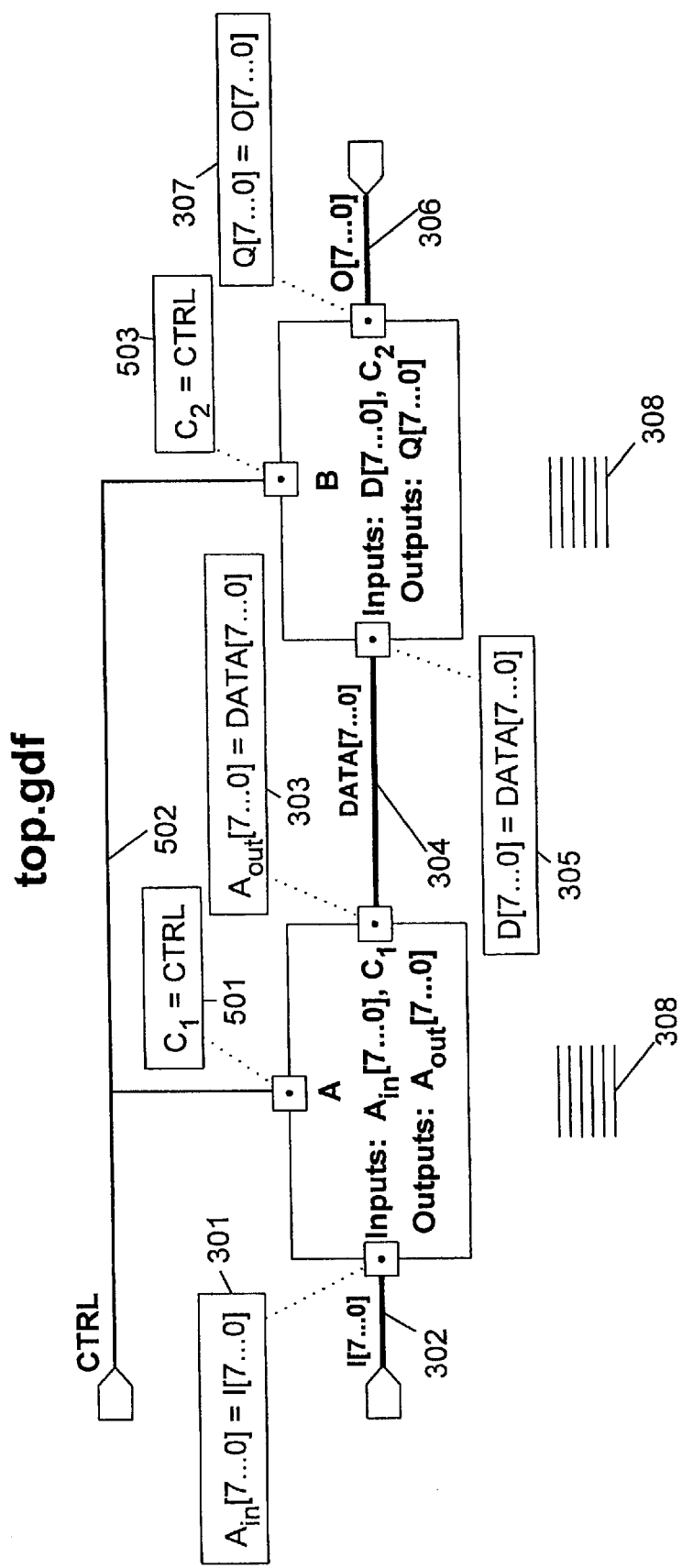
FIG. 5 is an updated version of the block diagram of FIG. 3.
Figure 6:
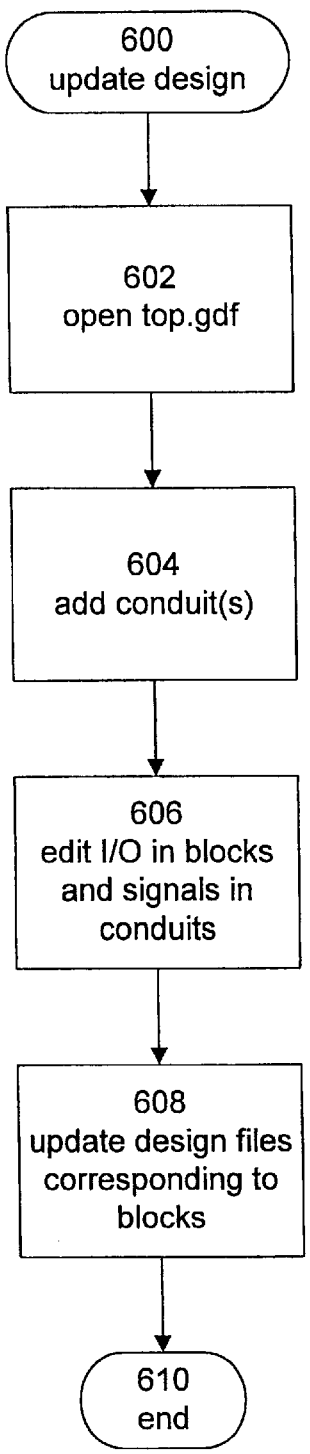
FIG. 6 is a flowchart illustrating the manner in which the block diagram of FIG. 5 was updated.

The manner in which a design is updated and the related .gdf and design files may be modified will now be described with reference to the block diagram of FIG. 5 and the flowchart of FIG. 6. FIG. 5 is an updated version of the block diagram of FIG. 3 with an additional conduit 502 carrying signal CTRL connected to inputs $C_1$ and $C_2$ of blocks A and B, respectively. Initially, the graphic design file top.gdf is opened in the graphic editor (step 602). The additional conduit is added (step 604) and the I/O for blocks A and B are edited to add inputs $C_1$ and $C_2$, and the signal name CTRL is associated with the new conduit (step 606). The design file for each block is then updated by selecting the blocks and executing one or more "update" commands (step 608). The mapping of $C_1$ and $C_2$ to the signal CTRL is represented in boxes 501 and 503, respectively. If no updates are performed the graphic editor prompts the user (e.g., via a dialog box or the equivalent) to determine whether any updates should be performed for any of the design files associated with the altered block diagram. This prompt may occur, for example, when the user is saving a file, quitting, or switching between editor windows. The prompt may also occur when the user is opening a file if changes have been made to related files.

According to a specific embodiment, the user can specify whether the updates should be automatic, i.e., done without further prompting, or whether any prompting should occur regardless of whether or not any updates are performed. Although the above example describes the addition of a conduit, it will be understood that blocks may also be added to a previously complete .gdf file in substantially the same manner. It will also be understood that updates may be performed in either direction in a design hierarchy. That is, if a gate level design file is altered in a way which affects a higher level block diagram of which the gate level design file is a part, the designer may execute an update to incorporate the necessary changes from the lower to the higher level design file.

Once the design is specified down to the gate level, the graphic editor of the present invention may also be employed to facilitate simulation of the design and/or any of the individual blocks in the hierarchy. Simulation of different portions of a design has been problematic in the past because it has typically been necessary to make a copy of the entire design file and remove the portions not to be included in the simulation. The difficulty of doing this using VHDL or Verilog is well understood by those of skill in the art. By contrast, the graphic editor described herein may be used to select a region including one or more blocks of a block diagram in the GUI by, for example, enclosing or excluding the region in some manner (e.g., with a rectangle), and to execute a simulation for only the selected region or block. The appropriate test protocol and test vectors would, of course, still need to generated according to any of a variety of well known techniques, but the work in isolating the portions of the design to be simulated is greatly reduced.

The graphic editor of the present invention also includes a feature whereby the optimization information of the simulated blocks and/or regions are automatically provided in the diagram as visual text annotations in the appropriate locations. That is, once a simulation has been performed, the performance data for each block in the simulation are presented on the screen in a format which may be customized by the designer. This facilitates a more intuitive and less cumbersome technique for evaluation of a design in contrast to the less convenient situation in which such performance information is provided in a separate file.

Figure 7:
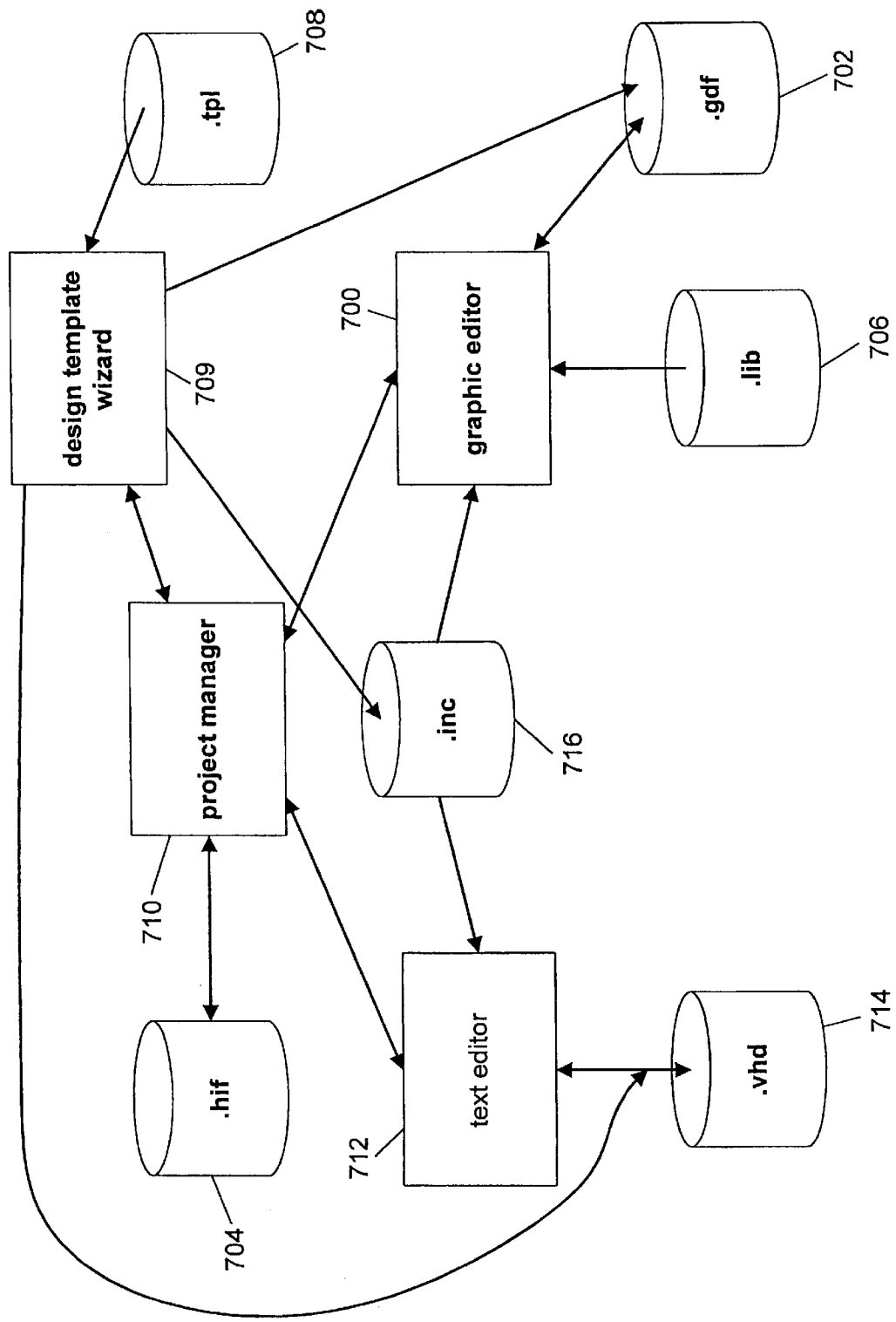
FIG. 7 is an information flow diagram according to a specific embodiment of the invention.

FIG. 7 is a diagram which illustrates the flow of information according to a specific embodiment of the invention. Graphic editor 700 reads from and writes to graphic design database 702 in which all design files created using the graphic editor are stored. Graphic editor 700 uses blocks and symbols from library database 706 to construct the block diagrams. Design file templates in database 708 correspond to a variety of design file formats and are manipulated with a design template wizard 709 to generate design files. The operation of design template wizard in this regard is described in the copending application incorporated by reference above. A project manager 710 interacts with and facilitates the operation of graphic editor 700 and text editor 712 (as well as a variety of other software modules). For example, as shown, project manager 710 interacts with hierarchy information database 704 (which stores the hierarchy information files for each IC design) to determine when an update of a design file is necessary and notifies the appropriate editor. Text editor 712 reads from and writes to text design file database 714 (in this example a repository of VHDL files) and reads from include file database 716. Graphic editor 700 also reads from include file database 716. Each of the include files in database 716 stores only the interface information, i.e., I/O specification, for an associated design file and is created when the design file is created. An include file allows the incorporation of a "child" design file in a "parent" design file even where the design files are in different formats (e.g., text vs. graphic) by storing the interface information in a format that the parent file will understand. When design template wizard 709 creates a design file using templates from database 708, the new design file is written to the appropriate design file database (e.g., database 702 or 714) and the relevant interface information is written to include database 716.

Figure 8:
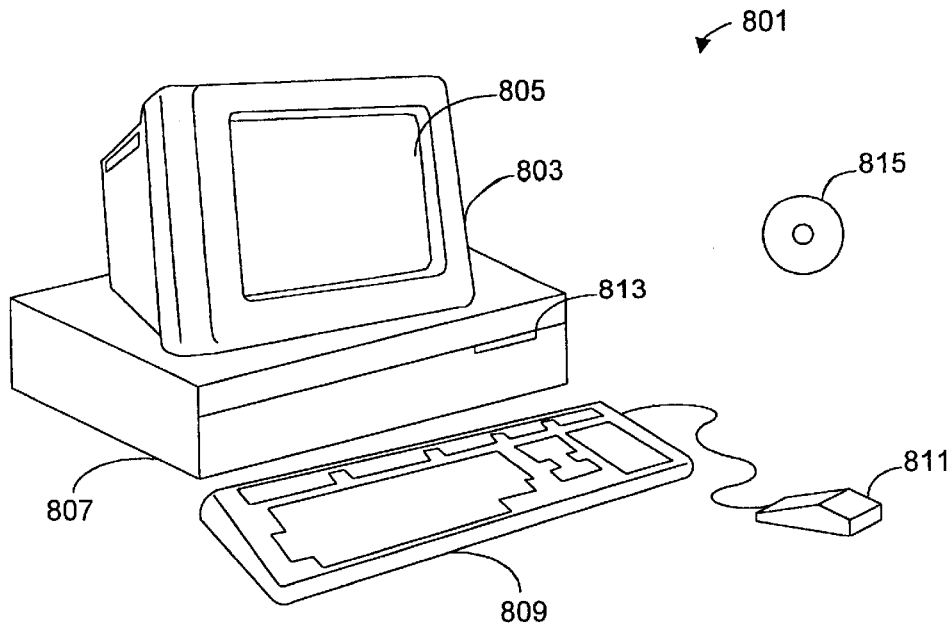
FIG. 8 is an example of a computer system that may be utilized to execute the software of an embodiment of the invention.

FIG. 8 illustrates an example of a computer system that may be used to execute the software of an embodiment of the invention. FIG. 8 shows a computer system 801 which includes a display 803, screen 805, cabinet 807, keyboard 809, and mouse 811. Mouse 811 may have one or more buttons for interacting with a graphical user interface. Cabinet 807 houses a CD-ROM drive 813, system memory and a hard drive (see FIG. 9) which may be utilized to store and retrieve software programs incorporating computer code that implements the invention, data for use with the invention, and the like. Although the CD-ROM 815 is shown as an exemplary computer readable storage medium, other computer readable storage media including floppy disks, tape, flash memory, system memory, and hard drives may be utilized.

Figure 9:
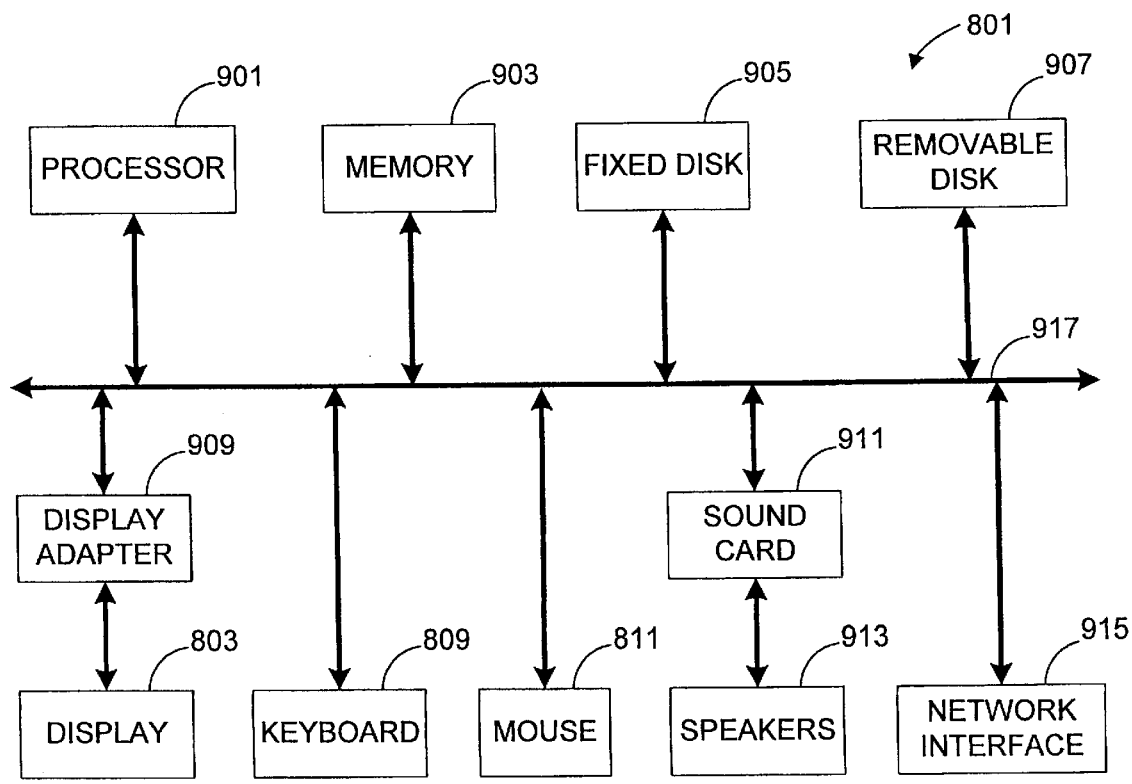
FIG. 9 shows a system block diagram of the computer system of FIG. 8.

FIG. 9 shows a system block diagram of computer system 801 used to execute the software of an embodiment of the invention. As in FIG. 8, computer system 801 includes monitor 803 and keyboard 809, and mouse 811. Computer system 801 further includes subsystems such as a central processor 901, system memory 903, fixed disk 905 (e.g., hard drive), removable disk 907 (e.g., CD-ROM drive), display adapter 909, sound card 911, speakers 913, and network interface 915. Other computer systems suitable for use with the invention may include additional or fewer subsystems. For example, another computer system could include more than one processor 901 (i.e., a multi-processor system), or a cache memory.

The system bus architecture of computer system 801 is represented by arrows 917. However, these arrows are illustrative of any interconnection scheme serving to link the subsystems. For example, a local bus could be utilized to connect the central processor to the system memory and display adapter. Computer system 801 shown in FIG. 9 is but an example of a computer system suitable for use with the invention. Other computer architectures having different configurations of subsystems may also be utilized.

While the invention has been particularly shown and described with reference to specific embodiments thereof, it will be understood by those skilled in the art that changes in the form and details of the disclosed embodiments may be made without departing from the spirit or scope of the invention. For example, the present invention provides a high degree of flexibility to suit individual design styles. So, if a particular designer wants to start from a library of design files, he could, for example, instantiate fully specified blocks corresponding to selected design files in the library into a higher level block diagram. That is, the designer could work from the lower level design file toward the higher level block diagram rather than the other direction as described above. Moreover, the present invention is not restricted to the design of a specific type of circuitry. Rather the present invention may be employed, for example, in the design of programmable logic devices, gate arrays, discrete circuitry, and a wide variety of integrated circuits. Therefore, the scope of the invention should be determined with reference to the appended claims.

What is claimed is:

1. A method for designing a circuit using graphic editor software, comprising:

generating a first graphic design file corresponding to a first block diagram created in a graphical user interface associated with the graphic editor software, the first block diagram comprising a plurality of blocks and a plurality of conduits interconnecting the blocks; and generating a block design file in one of a plurality of formats for each of selected ones of the plurality of blocks in the first block diagram, each of the block design files corresponding to an implementation of its corresponding block, wherein the plurality of blocks include fully specified blocks and partially specified blocks;

wherein modifications to any of the first graphic design file and the block design files are incorporated into each other under software control.

2. The method of claim 1 wherein generating the first graphic design file comprises:

assigning I/O to each block in the first block diagram;

assigning at least one signal name for each conduit in the first block diagram; and determining correspondence between the I/O and the at least one signal name.

3. The method of claim 1 wherein the plurality of formats includes at least one text format.

4. The method of claim 1 wherein selected ones of the conduits each represent a plurality of bidirectional signal paths.

5. The method of claim 1 wherein generating the block design file comprises:

instantiating I/O associated with each of the selected blocks in a corresponding block design file; and specifying the implementation of each of the selected blocks in the corresponding block design file using a design file editor.

6. The method of claim 5 wherein the design file editor comprises a text editor.

7. The method of claim 5 wherein the design file editor comprises a schematic editor.

8. The method of claim 1 further comprising generating a hierarchy information file relating the first graphic design file and the block design files, thereby facilitating incorporation of the modifications.

9. The method of claim 8 further comprising using the hierarchy information file to determine whether a first modification to one of the first graphic design file and the block design files requires modification to any other of the first graphic design file and the block design files.

10. The method of claim 1 wherein the plurality of blocks comprises multiple instances of a single block type.

11. The method of claim 1 wherein one of the block design files comprises a second graphic design file for one of the plurality of blocks, the second graphic design file corresponding to a lower level block diagram created in the graphical user interface.

12. The method of claim 1 wherein selected ones of the first graphic and block design files incorporate custom features specified by a designer.

13. The method of claim 1 further comprising querying a user as to whether a related file should be updated in response to the modifications.

14. The method of claim 1 further comprising:

selecting at least one of the plurality of blocks in the graphical user interface for simulation of circuit level performance; and simulating the circuit level performance of the at least one of the plurality of blocks thereby generating performance data.

15. The method of claim 14 wherein selecting at least one of the plurality of blocks comprises enclosing a region of the first block diagram within a rectangle.

16. The method of claim 15 wherein the at least one of the plurality of blocks is within the rectangle.

17. The method of claim 15 wherein the at least one of the plurality of blocks is outside of the rectangle.

18. The method of claim 14 further comprising presenting the performance data in the first block diagram associated with the at least one block.

19. A circuit designed by a method comprising:

generating a first graphic design file corresponding to a first block diagram created in a graphical user interface associated with the graphic editor software, the first block diagram comprising a plurality of blocks and a plurality of conduits interconnecting the blocks; and generating a block design file in one of a plurality of formats for each of selected ones of the plurality of blocks in the first block diagram, each of the block design files corresponding to an implementation of its corresponding block, wherein the plurality of blocks include fully specified blocks and partially specified blocks; wherein modifications to any of the first graphic design file and the block design files are incorporated into each other under software control.

20. At least one computer readable medium containing program instructions for designing a circuit using graphic editor software, said at least one computer readable medium comprising:

computer readable code for generating a first graphic design file corresponding to a first block diagram created in a graphical user interface associated with the graphic editor software, the first block diagram comprising a plurality of blocks and a plurality of conduits interconnecting the blocks;

computer readable code for generating a block design file in one of a plurality of formats for each of selected ones of the plurality of blocks in the first block diagram, each of the block design files corresponding to an implementation of its corresponding block, wherein the plurality of blocks include fully specified blocks and partially specified blocks; and computer readable code for incorporating modifications to any of the first graphic design file and the block design files into each other.

21. The at least one computer readable medium of claim 20 wherein the computer readable code for generating the first graphic design file comprises:

computer readable code for assigning I/O to each block in the first block diagram;

computer readable code for assigning at least one signal name for each conduit in the first block diagram; and computer readable code for determining correspondence between the I/O and the at least one signal name.

22. The at least one computer readable medium of claim 20 wherein the plurality of formats includes at least one text format.

23. The at least one computer readable medium of claim 20 wherein selected ones of the conduits each represent a plurality of bidirectional signal paths.

24. The at least one computer readable medium of claim 20 wherein the computer readable code for generating the block design file comprises:

computer readable code for instantiating I/O associated with each of the selected blocks in a corresponding block design file; and computer readable code for enabling a user to specify the implementation of each of the selected blocks in the corresponding block design file.

25. The at least one computer readable medium of claim 24 wherein the computer readable code for enabling a user to specify the implementation of each of the selected blocks comprises a text editor.

26. The at least one computer readable medium of claim 24 wherein the computer readable code for enabling a user to specify the implementation of each of the selected blocks comprises a schematic editor.

27. The at least one computer readable medium of claim 20 further comprising computer readable code for generating a hierarchy information file relating the first graphic design file and the block design files.

28. The at least one computer readable medium of claim 27 further comprising computer readable code for using the hierarchy information file to determine whether a first modification to one of the first graphic design file and the block design files requires modification to any other of the first graphic design file and the block design files.

29. The at least one computer readable medium of claim 20 wherein the plurality of blocks comprises multiple instances of a single block type.

30. The at least one computer readable medium of claim 20 wherein one of the block design files comprises a second graphic design file for one of the plurality of blocks, the second graphic design file corresponding to a lower level block diagram created in the graphical user interface.

31. The at least one computer readable medium of claim 20 wherein selected ones of the first graphic and block design files incorporate custom features specified by a designer.

32. The at least one computer readable medium of claim 20 further comprising computer readable code for querying a user as to whether a related file should be updated in response to the modifications.

33. The at least one computer readable medium of claim 20 further comprising:
   computer readable code for selecting at least one of the plurality of blocks in the graphical user interface for simulation of circuit level performance; and
   computer readable code for simulating the circuit level performance of the at least one of the plurality of blocks thereby generating performance data.

34. The at least one computer readable medium of claim 33 wherein the computer readable code for selecting at least one of the plurality of blocks is responsive to a user enclosing a region of the first block diagram within a rectangle.

35. The at least one computer readable medium of claim 34 wherein the at least one of the plurality of blocks is within the rectangle.

36. The at least one computer readable medium of claim 34 wherein the at least one of the plurality of blocks is outside of the rectangle.

37. The at least one computer readable medium of claim 33 further comprising computer readable code for presenting the performance data in the first block diagram associated with the at least one block.

38. A computer system comprising:

a central processing unit;

a display;

a keyboard; and memory having stored therein program instructions for designing a circuit using graphic editor software, the memory comprising:

computer readable code for generating a first graphic design file corresponding to a first block diagram created in a graphical user interface associated with the graphic editor software, the first block diagram comprising a plurality of blocks and a plurality of conduits interconnecting the blocks;

computer readable code for generating a block design file in one of a plurality of formats for each of selected ones of the plurality of blocks in the first block diagram, each of the block design files corresponding to an implementation of its corresponding block, wherein the plurality of blocks include fully specified blocks and partially specified blocks; and computer readable code for incorporating modifications to any of the first graphic design file and the block design files into each other.

* * * * *